United States Patent
Thompson

(10) Patent No.: US 6,810,916 B2
(45) Date of Patent: Nov. 2, 2004

(54) HEATED DRAIN LINE APPARATUS

(75) Inventor: Alvin Dean Thompson, St. Joseph, MO (US)

(73) Assignee: DT Search & Designs, LLC, St. Joseph, MO (US)

(*) Notice: Subject to any disclaimer, the term of this patent is extended or adjusted under 35 U.S.C. 154(b) by 0 days.

(21) Appl. No.: 10/351,063

(22) Filed: Jan. 24, 2003

(65) Prior Publication Data
US 2004/0144438 A1 Jul. 29, 2004

(51) Int. Cl.[7] ............................................. F16L 53/00
(52) U.S. Cl. ........................... 138/32; 138/38; 138/112
(58) Field of Search ............................. 138/32, 38, 112, 138/149; 165/136, 164, 172, 177, 185

(56) References Cited

U.S. PATENT DOCUMENTS

| 2,707,095 | A | * | 4/1955 | Parsons et al. ............. 165/135 |
|---|---|---|---|---|
| 3,151,633 | A | * | 10/1964 | Shuman ...................... 138/177 |
| 3,269,422 | A | * | 8/1966 | Matthews et al. ........... 138/111 |
| 3,315,703 | A | * | 4/1967 | Matthews et al. ........... 138/111 |
| 3,331,946 | A | * | 7/1967 | Bilbro ......................... 219/535 |
| 3,377,463 | A | * | 4/1968 | Rolfes ......................... 392/478 |
| 3,522,413 | A | * | 8/1970 | Chrow ......................... 392/468 |
| 3,548,158 | A | * | 12/1970 | McCaskill ................... 219/530 |
| 3,617,699 | A | * | 11/1971 | Othmer ....................... 392/469 |
| 3,727,029 | A | * | 4/1973 | Chrow ......................... 392/468 |
| 3,904,394 | A | * | 9/1975 | Prast et al. ................... 62/50.7 |
| 3,955,601 | A | * | 5/1976 | Plummer, III ............... 138/149 |
| 3,972,821 | A | * | 8/1976 | Weidenbenner et al. ...... 252/75 |
| 4,031,611 | A | * | 6/1977 | Johnson, Jr. ................... 29/611 |
| 4,123,837 | A | * | 11/1978 | Horner ..................... 29/890.045 |
| 4,194,536 | A | * | 3/1980 | Stine et al. ................... 138/149 |
| 4,399,319 | A | * | 8/1983 | Zinn ............................. 174/47 |
| 4,653,541 | A | * | 3/1987 | Oehlschlaeger et al. .... 138/104 |
| 5,086,836 | A | * | 2/1992 | Barth et al. .................. 165/164 |

* cited by examiner

*Primary Examiner*—James Hook
(74) *Attorney, Agent, or Firm*—Shughart Thomson & Kilroy P.C.

(57) ABSTRACT

A drainage device and method of decreasing clogging in a drain pipe comprising heating the drain pipe with a heating element that is partially enclosed.

9 Claims, 2 Drawing Sheets

HEATED DRAIN LINE APPARATUS

STATEMENT REGARDING FEDERALLY SPONSORED RESEARCH OR DEVELOPMENT

Not Applicable.

FIELD OF THE INVENTION

The present invention is directed to a drain apparatus and in particular to a drain apparatus that is heated in order to prevent the drain from clogging.

DESCRIPTION OF RELATED ART

Various plumbing drainage systems are used in commercial and residential settings. For example, in industrial settings, such as slaughterhouses, a drain may collect liquid waste from multiple sources in the building.

Most homes have a fairly simple plumbing setup that includes hot and cold water supply lines, and a drain line for the sinks, toilets, and showers. Most plumbing fixtures in the home involve a drain trap, a J-shaped piece of drain pipe designed to provide a water barrier between the home and the potential of sewer gas. The traps hold water, which prevents the air-borne bacteria and odor of the sewer gas from entering the house. Each individual drain usually feeds into a larger sewage drain which is connected to the city's wastewater sewer system.

A common problem with drain lines—both industrial and residential—is that they are become blocked with hair, grease, lint, food, soap scum, and other particles. Today, there are many products on the market which are used to unclog drains that have become blocked with such materials, such as plungers, mechanical snakes, various chemicals, and even bacteria. These products are generally not preventative devices but merely assist the homeowner with manually unclogging the drain after a clog has arisen.

Some products on the market today supposedly help prevent clogs from occurring in the drain. These products generally involve enzymatic or chemical substances that must be manually poured down the drain on a periodic basis. Thus, the homeowner is often undesirably exposed to bacteria and/or other hazardous chemical substances when using such products.

BRIEF SUMMARY OF THE INVENTION

Therefore, it is an object of the present invention to provide a drainage device which helps prevent the drain from clogging or decreases the rate of such clogging.

It is another object of the present invention to provide a drainage device that does not require the homeowner to manually use the device on a periodic basis.

DETAILED DESCRIPTION OF PREFERRED EMBODIMENTS

The drainage device of the present invention employs heat adjacent to the drain line in order to prevent grease and other unwanted substances from building up along the drain line wall and forming a clog. While the present invention can be used for both commercial and residential purposes, the drain apparatus present invention will be described with reference to use within the home. Moreover, for illustrative proposes, the drainage device of the present invention will be described with reference to a faucet in the home. However, those skilled in the art will recognize that the present invention has applications to all types of drainage systems. Those skilled in the art will also appreciate that the present invention is well suited to be used in conjunction with all or part of the drain line, including the J-shaped drain trap of the drain line.

Figure 1:
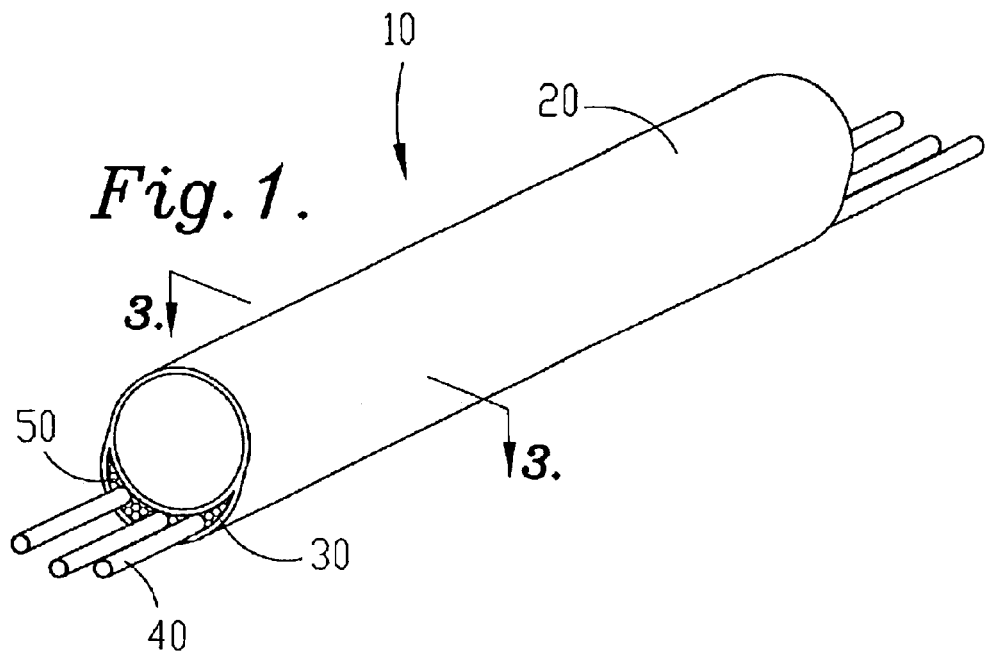
FIG. 1 is a perspective view of the drainage device of the present invention.
Figure 2:
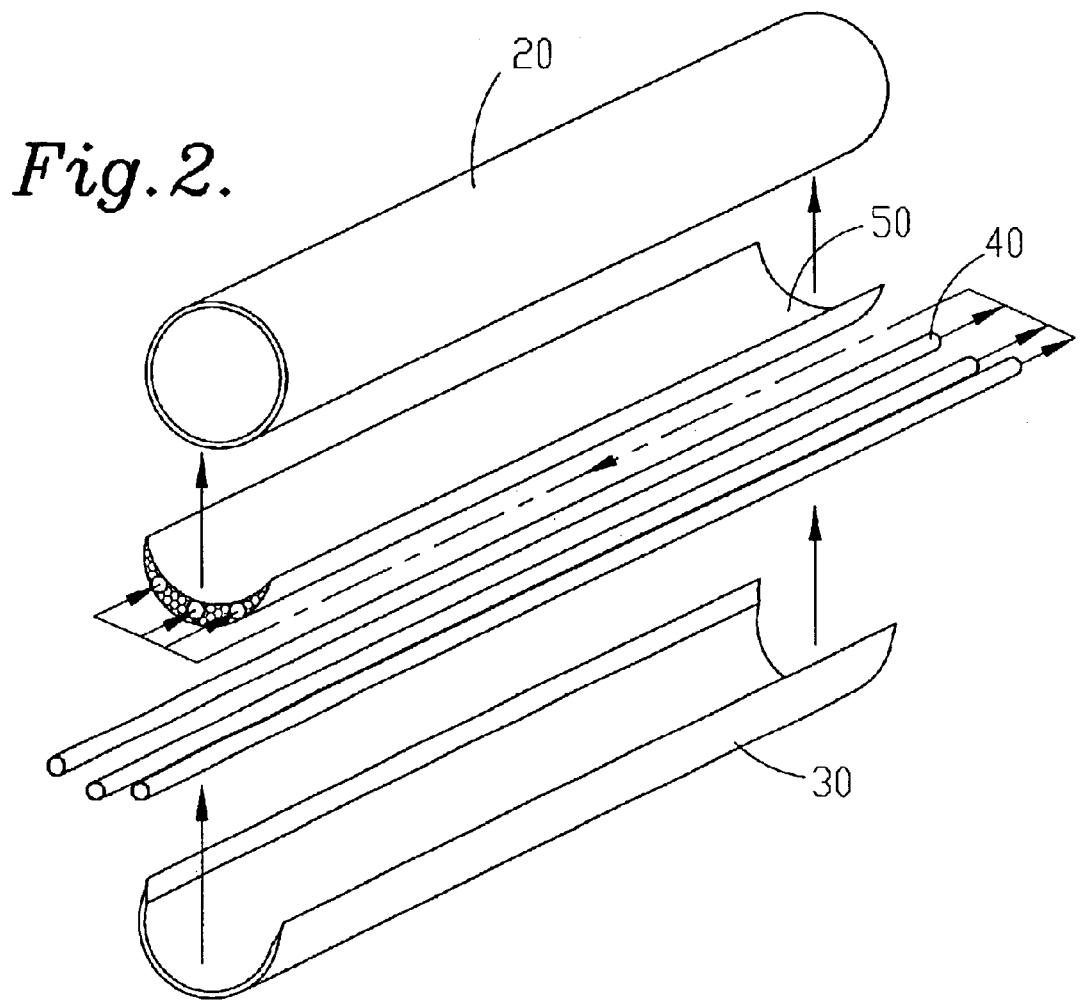
FIG. 2 is an exploded view of the drainage device of the present invention shown in FIG. 1.

As shown in FIGS. 1 and 2, the drainage device (10) of the present invention includes a drain line (20), outer sleeve (30), heating elements (40), and insulation (50).

The drain line (20) is a conventional pipe through which waste water and other components may flow. The drain line (20) is comprised of, for example, hard plastic (e.g., PVC, ABS), copper, stainless steel, brass, and the like.

The outer sleeve (30) comprises a half-cylinder and can be manufactured by simply cutting a pipe in half lengthwise. The outer sleeve (30) is made of any suitable material, but is preferably comprised of hard plastic.

Figure 3:
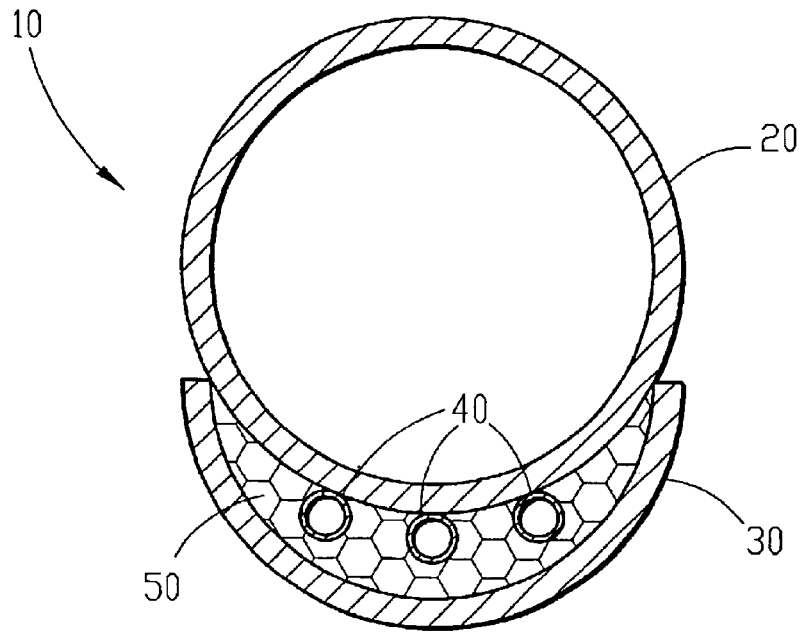
FIG. 3 is a cross-section of the drainage device shown in FIG. 1 taken though line 3—3.

As shown in FIG. 3, between the drain line (20) and the outer sleeve (30) are one or more heating elements (40). The heating elements (40) are preferably comprised of hot water retained in small plastic or rubber tubes that are positioned near or directly adjacent to the drain line to provide for sufficient heat transfer. Foam insulation (50) preferably surrounds the remaining space between the drain line (20) and the outer sleeve (30). The insulation (50) thus helps prevent heat from the heating elements (40) to be dissipated to the surrounding environment.

Figure 4:
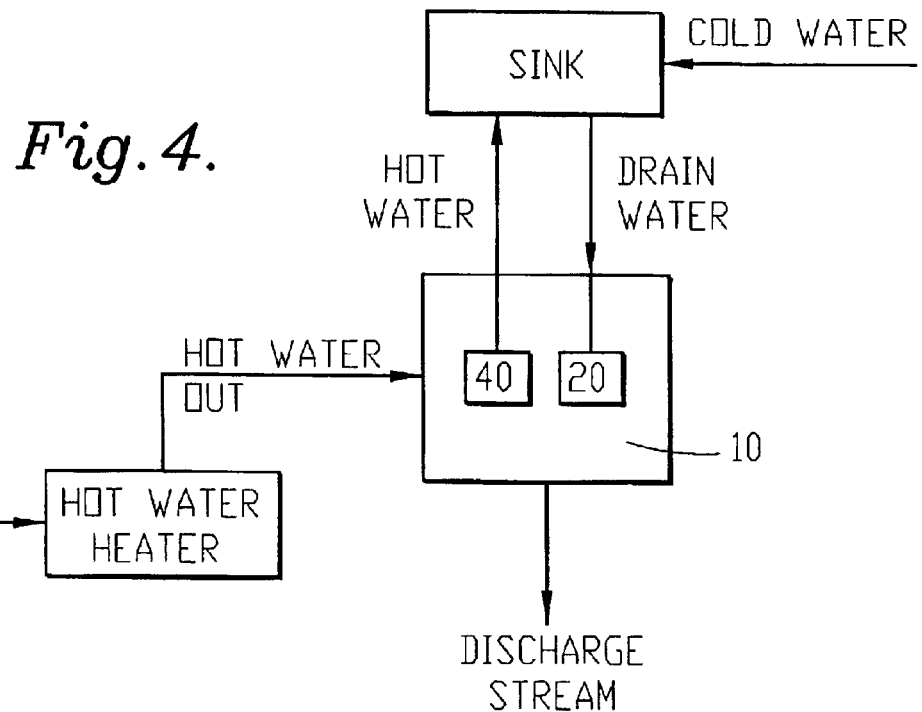
FIG. 4 is a flow diagram showing how the drainage device connected to a home's plumbing system.

As shown in FIG. 4, during use, the heating elements (40) are connected to the hot water heater of the building. As hot water is used, the hot water circulates through the heating elements (40) to the faucet and back through the drain line (20). Thus, the drain line (20) is heated as the water hot water moves into the faucet and as the hot water drains into the drain line (20). This heat prevents the grease, hair, and other debris from settling along the wall of the drain line (20). Accordingly, the rate at which the drain line (20) becomes clogged is decreased.

Those skilled in the art will recognize that other types of heating elements can be used in conjunction with the present invention. For example, the number, location, and orientation of the heating elements (40) can vary depending on the amount and type of fluid that is running through the drain line and the amount and type of waste material running through the drain line. Likewise, the heating element (40) could utilize hot water, steam, or an electrical heat source. When steam is used, the steam preferably travels from a boiler room in the building and is directed against the drain line (20) in a contained, directed manner. In such case, those skilled in the art will recognize that the heating element (40) may heat the drain line (20) even though no waste fluid is flowing through the line. Likewise, the drain line (40) could be wired with and electrical heating unit that would periodically heat the drain line or heat the drain line (20) on a continued basis.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A method for decreasing the rate at which a drain pipe is clogged, said method comprising:

providing a drain line; and heating at least a portion of said drain line with a heating element;

wherein said heating elements is at least partially enclosed from the environment so as to direct heat from the heating element toward said drain line;

wherein said heating element comprises hot water, and said hot water is enclosed in a tube adapted to receive hot water; and wherein said hot water first flows through said tube and subsequently flows through said drain line.

2. The method according to claim 1, wherein an outer sleeve at least partially covers the enclosed heating element.

3. The method according to claim 2, wherein insulation resides between said drain line and said outer sleeve and at least partially covers said enclosed heating element.

4. The method of claim 3, wherein said insulation comprises foam insulation.

5. The method according to claim 1, wherein said heating step is substantially continuous.

6. The method according to claim 1 wherein said heating element is directly adjacent to said drain line.

7. A method for decreasing the rate at which a drain pipe is clogged, said method comprising:

providing a drain line; and heating at least a portion of said drain line with a heating element comprised of hot water enclosed in a tube adapted to receive the hot water;

wherein said hot water first flows through said tube and subsequently flows through said drain line.

8. The method of claim 7, further comprising covering at least a portion of said drain line with an outer sleeve.

9. The method of claim 8, further comprising providing insulation between said drain line and said outer sleeve, said insulation at least partially covering said heating element.

* * * * *